(12) United States Patent
Sihra et al.

(10) Patent No.: US 11,885,417 B2
(45) Date of Patent: Jan. 30, 2024

(54) RADIAL SEPARATION SEAL

(71) Applicant: John Crane UK Limited, Slough (GB)

(72) Inventors: Inderpal Sihra, Windsor (GB); Aidan Nicholls, Reading (GB); Isaac Lopez, Brentford (GB)

(73) Assignee: JOHN CRANE UK LIMITED, Manchester (GB)

(*) Notice: Subject to any disclaimer, the term of this patent is extended or adjusted under 35 U.S.C. 154(b) by 0 days.

(21) Appl. No.: 17/695,222

(22) Filed: Mar. 15, 2022

(65) Prior Publication Data
US 2022/0290761 A1 Sep. 15, 2022

(30) Foreign Application Priority Data
Mar. 15, 2021 (GB) .................................... 2103583

(51) Int. Cl.
F16J 15/3284 (2016.01)

(52) U.S. Cl.
CPC ................. F16J 15/3284 (2013.01)

(58) Field of Classification Search
CPC ........ F16J 15/3284; F16J 15/44; F16J 15/441; F16J 15/442
See application file for complete search history.

(56) References Cited

U.S. PATENT DOCUMENTS

| 5,080,556 A | * | 1/1992 | Carreno | ................. | F01D 11/001 416/198 A |
| 5,149,109 A | | 9/1992 | Jelinek et al. | | |
| 5,709,388 A | * | 1/1998 | Skinner | .................. | F16J 15/442 277/412 |
| 5,934,684 A | * | 8/1999 | Brandon | ................ | F16J 15/442 277/421 |
| 2016/0169389 A1 | | 6/2016 | Haynes | | |

(Continued)

FOREIGN PATENT DOCUMENTS

| EP | 0803668 A1 | 10/1997 |
| GB | 2568225 A | 5/2019 |

OTHER PUBLICATIONS

GB Search Report for Application No. GB2103583.7, dated Aug. 17, 2021, 6 pages.

(Continued)

Primary Examiner — Gilbert Y Lee
(74) Attorney, Agent, or Firm — CANTOR COLBURN LLP

(57) ABSTRACT

A seal ring for a radial separation seal includes a first ring segment comprising a male portion and a second ring segment comprising a female portion. The female portion is configured to engage the male portion in the manner of a tongue and groove joint. The joint includes an inner interface at which the first ring segment abuts the second ring segment, the inner interface comprising two inner sealing surfaces; and outer interface at which the first ring segment abuts the second ring segment the outer interface comprising two outer sealing surfaces. The outer interface is radially outward from the inner interface so that when the first ring segment is in an engaged position with the second ring segment so that when a fluid flow provided to the inner interface, fluid pressure from the fluid flow pushes the inner sealing surfaces of the inner interface apart.

9 Claims, 6 Drawing Sheets

(56) References Cited

U.S. PATENT DOCUMENTS

2017/0307085 A1 10/2017 Haynes
2021/0246987 A1* 8/2021 Zimmitti ............... F16J 15/442

OTHER PUBLICATIONS

Notification of Transmittal of the International Search Report and the Written Opinion of the International Searching Authority, or the Declaration; PCT/GB20221050659; dated May 20, 2022, 14 pages.

* cited by examiner

RADIAL SEPARATION SEAL

CROSS-REFERENCE TO RELATED APPLICATIONS

This application claims priority to United Kingdom Application No. 2103583.7 filed Mar. 15, 2021, the entire contents of which is incorporated herein by reference.

FIELD OF INVENTION

The present invention relates to mechanical seal, in particular, the present invention relates to radial separation seals.

BACKGROUND

Typical radial separation seal rings typically comprise a plurality of arcuate segments connected together to form an annular seal ring. Typical seal rings comprise carbon graphite or ceramic. The seal ring is disposed around a rotatable shaft. The seal ring is configured to provide a seal between a gas seal cavity and a bearing cavity.

The arcuate segments of typical radial separation seal rings are configured to move apart from one another to increase the effective size (e.g. the effective radius of the seal ring) of the radial separation seal ring thereby providing a seal.

In use the seal ring receive a fluid flow between the shaft and the seal ring e.g. the fluid flows between the shaft and the seal ring. The fluid between the seal ring and the shaft may generate a lifting force that displaces the seal body generally radially to minimize contact with an outer tangential surface of the shaft.

Radial separation seals may also be referred to as lift-off seals.

SUMMARY

Aspects of the invention are set out in the independent claims and optional features are set out in the dependent claims. Aspects of the disclosure may be provided in conjunction with each other, and features of one aspect may be applied to other aspects.

An aspect provides a seal ring for a radial separation seal. The seal ring of this aspect includes: a first ring segment comprising a male portion; and a second ring segment comprising a female portion, wherein the female portion is configured to engage the male portion in the manner of a tongue and groove joint. The joint has an inner interface at which the first ring segment abuts the second ring segment, the inner interface comprising two inner sealing surfaces and outer interface at which the first ring segment abuts the second ring segment the outer interface comprising two outer sealing surfaces. The outer interface is radially outward from the inner interface so that when the first ring segment is in an engaged position with the second ring segment in the event that a fluid flow is provided to the inner interface, fluid pressure from the fluid flow pushes the inner sealing surfaces of the inner interface apart to seal the outer interface.

In the engaged position, the female portion and the male portion may be configured to permit relative movement between the first ring segment and the second ring segment.

The two sealing surfaces may comprise flat portions.

The seal at the outer interface may comprise planar contact between the two outer sealing surfaces.

The outer sealing surfaces may be configured to resist jack-knifing when the outer sealing surfaces are in abutment.

An aspect provides a seal ring for a radial separation seal is disclosed. The seal ring can include a first ring segment comprising a male portion and a second ring segment comprising a female portion. The female portion is configured to engage the male portion in the manner of a tongue and groove joint. The joint has the joint has an inner interface at which the first ring segment abuts the second ring segment; and an outer interface at which the first ring segment abuts the second ring segment. The outer interface is radially outward from the inner interface, and, wherein the two interfaces are each provided by a pair of flat planar sealing surfaces to provide planar contact between the two ring segments thereby to resist jack-knifing between the first ring segment and the second ring segment.

The second ring segment may comprise: an axial face, wherein in the engaged position an axial edge of the inner segment is closed by the axial face, so that in the event that a fluid flow is provided to the inner abutment, the axial face is configured to direct the fluid flow to the inner abutment.

In the engaged position an axial edge of the outer abutment may be closed by the axial face, wherein in the event that a fluid flow is provided to the inner abutment, the axial face and the outer sealing surfaces are configured to provide a seal).

Seal rings of the disclosure may prevent jack-knifing between the female portion and the male portion of adjacent seal ring segments. Preventing jack-knifing between the female portion and the male portion of adjacent seal ring segments prevents the female portion and the male portion being in point or line contacts between. Point and line contacts provide non-concentric sealing profiles between adjacent ring segments. Planar contact provides concentric sealing profiles between adjacent ring segments. Concentric sealing profiles provide better seals than non-concentric seals, therefore, providing a seal ring wherein jack-knifing is prevented thereby prevents non-concentric sealing profiles between adjacent seal ring segments.

The seal ring may be configured to expand (e.g. increase in radial extent) to provide a seal and thereby prevent fluid migration from an outward cavity. The seal ring may be configured to expand from a contracted position to an expanded position.

The contracted position may be defined as the position of the seal ring segments in the seal ring wherein there is a minimum separation $\Delta D_{min}$ between all adjacent seal ring segments.

The maximum expanded position may be defined as the position of the seal ring segments in the seal ring wherein there is a maximum separation $\Delta D_{max}$ between all adjacent seal ring segments.

There are a continuous number of expanded positions. An expanded position comprises a position of the seal ring segments in the seal ring wherein there is a separation $\Delta D$ between each adjacent seal ring segment. The separation $\Delta D$ in any expanded position is greater than the minimum separation $\Delta D_{min}$ (in the contracted position) and less than the minimum separation $\Delta D_{max}$ (in the maximum expanded position).

The seal ring may be configured to expand (e.g. increase in radial extent). For example, a fluid flow may be provided to an inner tangential surface of each of the seal ring segments. The inner tangential surface of the seal ring segments may comprise one or more axial grooves. The axial grooves may extend along most of the axial extent of the seal ring segments (e.g. the axial grooves extend along 50% or more of the seal inner tangential surface). The axial grooves may be configured to receive a fluid flow (e.g. a fluid flow is capable of flowing along the axial grooves). At least one of the axial grooves on the inner tangential surface of a seal ring segment may be in fluid communication with the inner interface formed by the seal ring segment and a neighbouring seal ring segment.

A fluid flow provided to an inner tangential surface of the seal ring segments may exert a radially outward pressure on the radially inner surface of the seal ring (e.g. in each of the axial grooves). The radially outward pressure exerts a radially outward force on the seal ring segment. The seal ring segment will move radially outwards if the radially outward force is greater than the combination of the weight of the seal ring segment and the radially inward tension provided by the garter springs. When the radially outward force exceeds a predetermined lift-off force, the seal ring segment is moved in a radially outward direction (e.g. away from a rotational axis of a seal assembly). The pre-determined lift-off force may be based on any of: the weight of the seal ring segment; and, radially inward tension provided by garter springs.

The fluid flow provided to the inner interface of a joint between two seal ring segments may be a process fluid or a buffer fluid of a seal assembly.

In examples, in a normal operation mode the fluid flow provided to the inner interface of a joint between two seal ring segments is a buffer fluid (e.g. a separation seal fluid).

In examples, the fluid flow provided to the inner interface of a joint between two seal ring segments is a process fluid (e.g. process gas).

In examples, in an upset condition (e.g. in the event of a dry gas seal failure), the fluid flow provided to the inner interface of a joint between two seal ring segments is a process fluid (e.g. process gas).

In examples, the fluid flow provided to the inner interface of a joint between two seal ring segments may be referred to as a separation seal fluid.

The fluid flow provided to an inner tangential surface of the seal ring segments may be a process fluid or a buffer fluid of a seal assembly.

The seal ring may be configured to contract (e.g. increase in radial extent). For example, garter springs may be provided which exert a radially inward tension on the seal ring segments. For example, reduction of the radially outward force on the inner tangential surface of the seal ring segments (e.g. due to a reduction in the radially outward pressure) to below the predetermined lift-off force.

The seal ring is configured to expand and contract such that the separation between each pair of adjacent seal ring segments is the same.

The sealing surfaces at the outer interface may be forced to abut when the joint is energised by a fluid flow to the inner interface. Providing sealing surfaces which are flat at the outer interface may permit planar contact between the sealing surfaces at the outer interface. Planar contact between the sealing surfaces at the outer interface may resist jack-knifing between the female portion and a male portion. Preventing jack-knifing is advantageous for reasons described herein.

An aspect provides a ring segment for a seal ring of a radial separation seal. The seal ring includes a first complementary portion disposed on a first end of the ring segment and a second complementary portion on a second end of the ring segment. The first complementary portion and the second complementary portion are each configured to engage a complementary portion of another similar ring segment in the manner of a tongue and groove joint between neighbouring ring segments, thereby to be assembled to another said similar ring segment to provide said seal ring, each joint having an inner interface comprising a pair of inner sealing surfaces and an outer interface comprising a pair of outer sealing surfaces and when assembled the outer interface is radially outward from the inner interface and arranged so that in the event that a fluid flow is provided to the inner interface, fluid pressure from the fluid flow pushes each of the pairs of sealing surfaces at each inner interface apart to respectively seal each outer interface.

In the engaged position, each first complementary portion and second complementary portion may be configured to permit relative movement between neighbouring ring segments.

The two sealing surfaces may comprise flat portions.

The outer interface may comprise planar contact between the two sealing surfaces when the outer interface is sealed.

The outer sealing surfaces may be configured to prevent jack-knifing when the outer interface is sealed.

The first complementary portion may be a male portion; and, the second complementary portion may be a female portion.

The first complementary portion and the second complementary portion may be female portions.

The first complementary portion and the second complementary portion may be male portions.

The one or more female portions may comprise: an axial face, wherein in the engaged position an axial edge of the inner interface is closed by the axial face, so that in the event that a fluid flow is provided to the inner abutment, the axial face is configured to direct the fluid flow to the inner abutment.

In the engaged position an axial edge of the outer abutment may be closed by the axial face, wherein in the event that a fluid flow is provided to the inner abutment, the axial face and the outer sealing surfaces are configured to provide a seal.

An aspect provides a seal ring comprising a plurality of any of the ring segments described herein.

An aspect provides a seal assembly comprising at least one of the seal rings described herein.

An aspect provides use of any of the seal assemblies described herein to prevent fluid migration from an outward cavity.

One or both of, the first inner sealing surface and, the second inner sealing surface may be polished to reduce friction between these surfaces.

One or both of, the first outer sealing surface and, the second outer sealing surface may be polished to reduce friction between these surfaces.

In examples, the seal ring segments may be formed of carbon graphite. In examples the seal ring segments may be formed of molybdenum carbide and/or antimony carbide.

In examples, the seal ring segments may be formed of antimony carbide (e.g. carbon graphite impregnated with antimony) and comprise a molybdenum disulfide additive. Advantageously, providing the molybdenum disulfide additive reduces friction in comparison to examples wherein no such additive is provided.

Sealing the outer abutment comprises pushing the sealing surfaces of the outer abutment together, for example, to reduce or prevent fluid flow between the sealing surfaces.

The term "jack-knifing" or jack-knifing surfaces may refer to sealing surfaces at an interface which are non-parallel to each other, for example when the sealing surfaces are flat the angle between the planar surfaces is non-zero.

For example, the term "jack-knifing" may refer to arrangements wherein the first ring segment rotates about a secondary rotational axis and the second ring segment rotates about a tertiary rotational axis, wherein the secondary rotational axis and the tertiary rotational axis are parallel to the rotational axis of the seal and wherein the second rotational axis and the tertiary rotational axis are not coincident.

Herein the term "flat" may refer to a planar surface having no surface curvature.

Herein the term "seal ring" and "carbon ring" may refer to the same element. For example, a carbon ring may comprise a mixture of carbon with other elements such as antimony and molybdenum.

BRIEF DESCRIPTION OF THE FIGURES

Embodiments of the disclosure will now be described, by way of example only, with reference to the accompanying drawings, in which.

In the figures, like numerals denote like elements.

DETAILED DESCRIPTION

Figure 1:
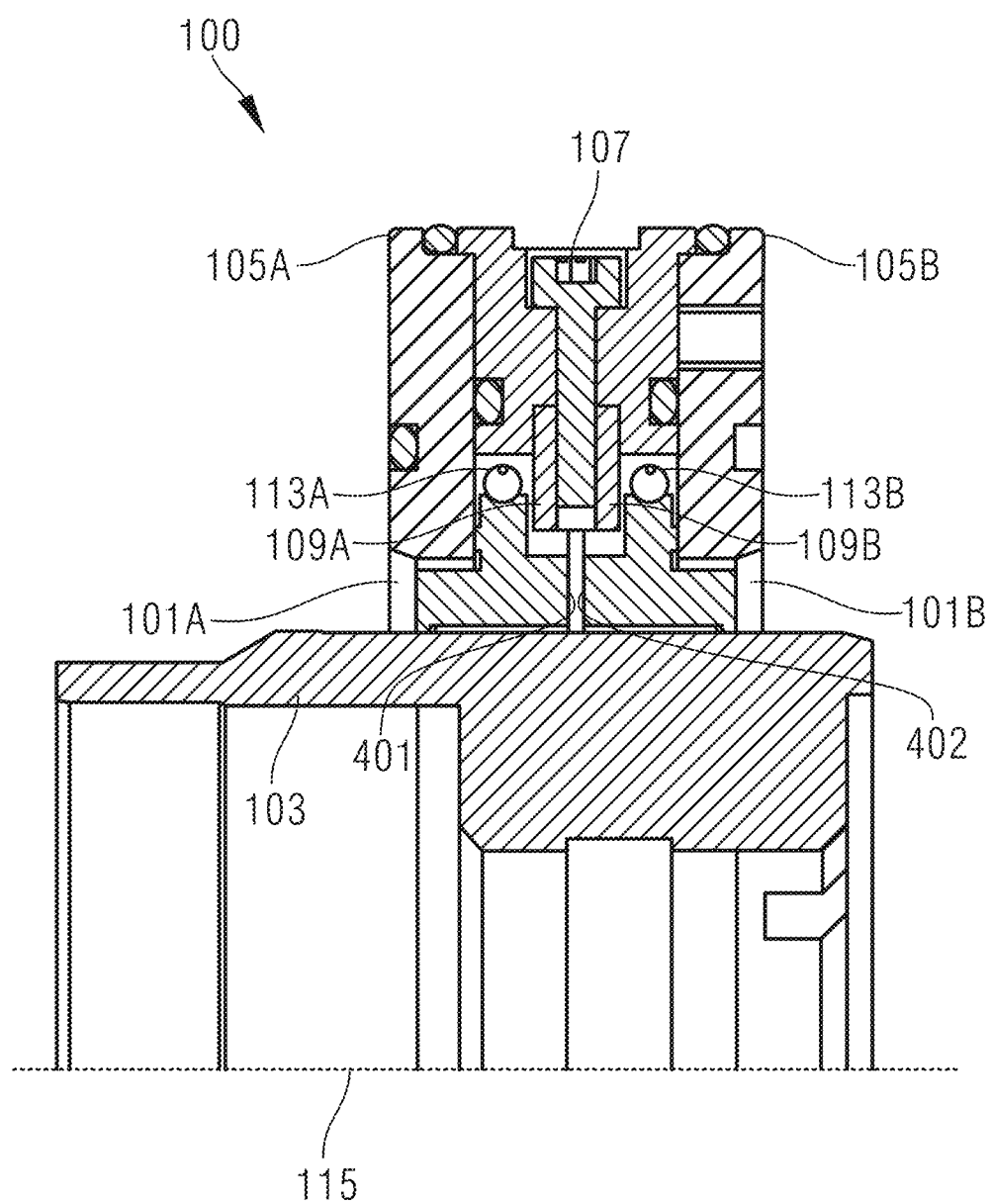
FIG. 1 illustrates a radial cross-sectional view of gas seal cavity.

FIG. 1 illustrates a radial cross-sectional view of gas seal cavity. The gas seal cavity comprises: a pair of seal rings 101A, 110B; a sleeve 103; a pair of clamp plates 105A, 105B; garter springs 113A and 113B; and a primary rotational axis 115. The gas seal cavity may comprise: a pair of anti-rotation pins 109A, 109B.

A gas seal cavity may be provided on the left-hand side of the arrangement shown in FIG. 1. A bearing cavity may be provided on the right-hand side of the arrangement shown in FIG. 1.

Each seal ring 101A, 101B is arranged around the rotational axis 115 (e.g. such that the rotational axis passes through a central hole defined by each ring. Each seal ring 101A, 101B is composed of a plurality of seal ring segments. Each seal ring segment is connected to a pair of neighbouring seal ring segments, wherein one neighbouring seal ring segment is connected at a first end of the seal ring segment and another neighbouring seal ring segment is connected at a second end of the seal ring segment. Each seal ring segment is connected to a neighbouring seal ring segment by means of complementary portions disposed on both ends of each seal ring segment e.g. a male portion disposed on one end of the seal ring segment and a female portion disposed on the other end of the seal ring segment. Corresponding complementary portions (e.g. a male portion and a female portion) are configured to engage in the manner a tongue and groove joint. Each seal ring has an inner tangential surface and an outer tangential surface. The seal rings have a radial cross section which is L-shaped. The seal rings comprise a nook e.g. a right angle formed by the L-shape. The seal ring and the seal ring segments are described in more detail below. The first seal ring 101A, may comprise a hole configured to receive the first anti-rotation pin 109A. The second seal ring 101B, may comprise a hole configured to receive the second anti-rotation pin 109B. The first seal ring comprises a rear side 401. The second seal ring comprises a rear side 402.

The sleeve 103 is disposed around the rotational axis 115. In examples, the sleeve 103 may comprise tungsten carbide.

Each clamp plate 105A, 105B has an inner tangential surface. Each clamp plate 105A, 105B is arranged around the rotational axis 115. Each clamp plate 105A, 105B is arranged around a respective seal ring 101A, 101B e.g. a first clamp plate 105A is arranged around an outer tangential surface of a first seal ring 101A and a second clamp plate 105B is arranged around an outer tangential surface of a second seal ring 101B. The inner tangential surface of each plate 105A, 105B contacts a respective seal ring 101A, 101B when each seal ring is in a maximum expanded position. When a first seal ring 101A is in the maximum expanded position, the inner tangential surface of the first clamp plate 105A contacts the outer tangential surface of the first seal ring 101A thereby providing a seal between the first seal ring 101A and the first clamp plate 105A. When a second seal ring 101B is in the maximum expanded position, the inner tangential surface of the second clamp plate 105B contacts the outer tangential surface of the second seal ring 101B thereby providing a seal between the second seal ring 101B and the second clamp plate 105B.

The first clamp plate 105A comprises a corner portion 403 which is sized to fit the nook of the first seal ring 101A when the first seal ring is in the maximum expanded position. The second clamp plate 105B comprises a corner portion 404 which is sized to fit the nook of the second seal ring 101B when the second seal ring is in the maximum expanded position.

The first anti-rotation pin 109A may extend from the first clamp plate 105A. The first anti-rotation pin 109A may sized to fit the hole in the first seal ring 101A. The second anti-rotation pin 109B may extend from the second clamp plate 105B. The second anti-rotation pin 109B may be sized to fit the hole in the second seal ring 101A.

In examples, the hole may be replaced with a groove. In examples, more than one anti-rotation pin may be provided. In such examples, a corresponding number of holes and/or grooves are provided in the seal ring. In examples, an anti-rotation pin may be provided for each seal ring segment and accordingly each seal ring segment may comprise a hole or groove to receive an anti-rotation pin.

The first garter springs 113A are disposed between the first seal ring 101A and the first clamp plate 105A. The second garter springs 113B are disposed between the second seal ring 101B and the second clamp plate 105B.

Axial springs may be provided. The axial springs may be configured to apply an axially acting force on each of the seal rings. For example, the axial springs may force the seal rings towards one another or alternatively, may force the seal rings away from one another.

Each seal ring 101A, 101B is configured to operate as a radial lift-off seal ring. Each seal ring is configured to expand in a radial direction e.g. each seal ring is configured to expand to increase the radial extent of the seal ring. Each seal ring is configured to expand when a fluid flow is provided between the seal ring 101 and the sleeve 103. The seal ring segments are configured to move away from one another when the seal ring is rotated, thereby causing the seal ring to expand in a radial direction. When the seal rings 101 expands, the seal rings 101 lifts off the sleeve 103 and accordingly the seal rings 101 no longer contacts the sleeve 103.

The sleeve 103 is configured to rotate about the rotational axis 115. The sleeve is configured to contact the seal rings 101 when the seal rings are in a contracted state.

The clamp plates 105A, 105B are configured to provide a seal with the seal rings 101A, 101B. The clamp plates 105A, 105B are configured to constrain the radial expansion of the seal rings 101. For example, when the inner tangential surface of the first clamp plate 105A contacts (e.g. abuts) the outer tangential surface of the first seal ring 101A, the contact between the first clamp plate 105A and the first seal ring 101A acts to prevent further radial expansion of the first seal ring 101A. For example, when the inner tangential surface of the first clamp plate 105A contacts (e.g. abuts) the outer tangential surface of the first seal ring 101A, the contact between the first clamp plate 105A and the first seal ring 101A acts to prevent further radial expansion of the first seal ring 101A.

The first anti-rotation pin 109A may be configured to prevent rotation of the first seal ring 101A about the rotational axis 115. The second anti-rotation pin 109B may be configured to prevent rotation of the second seal ring 101B about the rotational axis 115.

The first garter springs 113A are configured to bias the first seal ring 101A (e.g. the first seal ring segments) towards the rotational axis 115. The second garter springs 113B are configured to bias the second seal ring 101B (e.g. the second seal ring segments) towards the rotational axis 115.

Figure 2A:
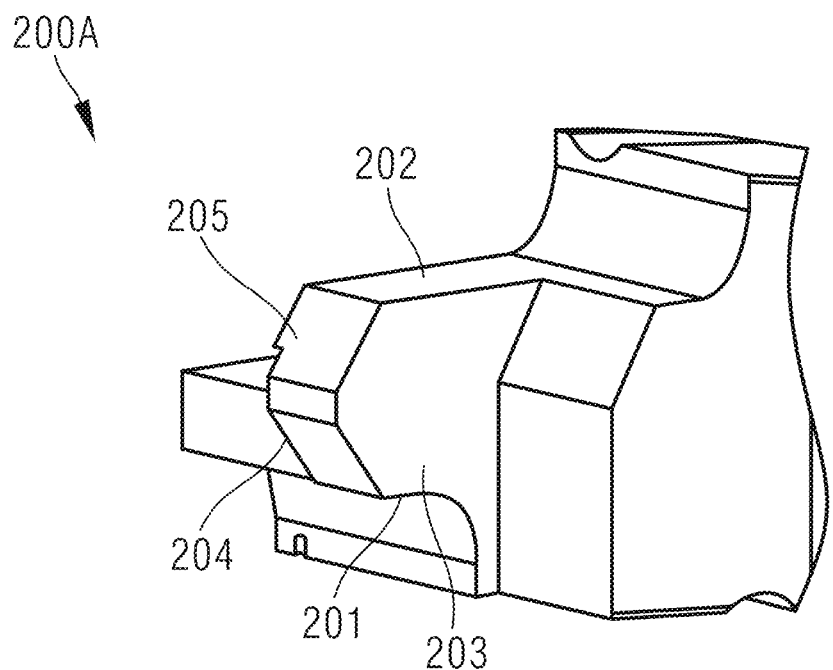
FIG. 2A illustrates a perspective view of a first ring segment 200A comprising a male portion.
Figure 2B:
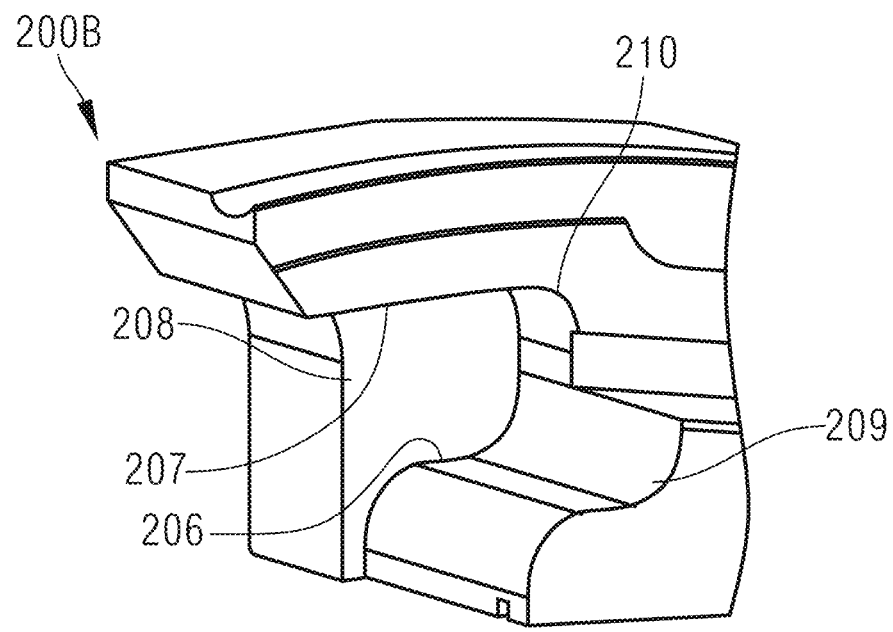
FIG. 2B illustrates a perspective view of a second ring segment 200B comprising a female portion.
Figure 3A:
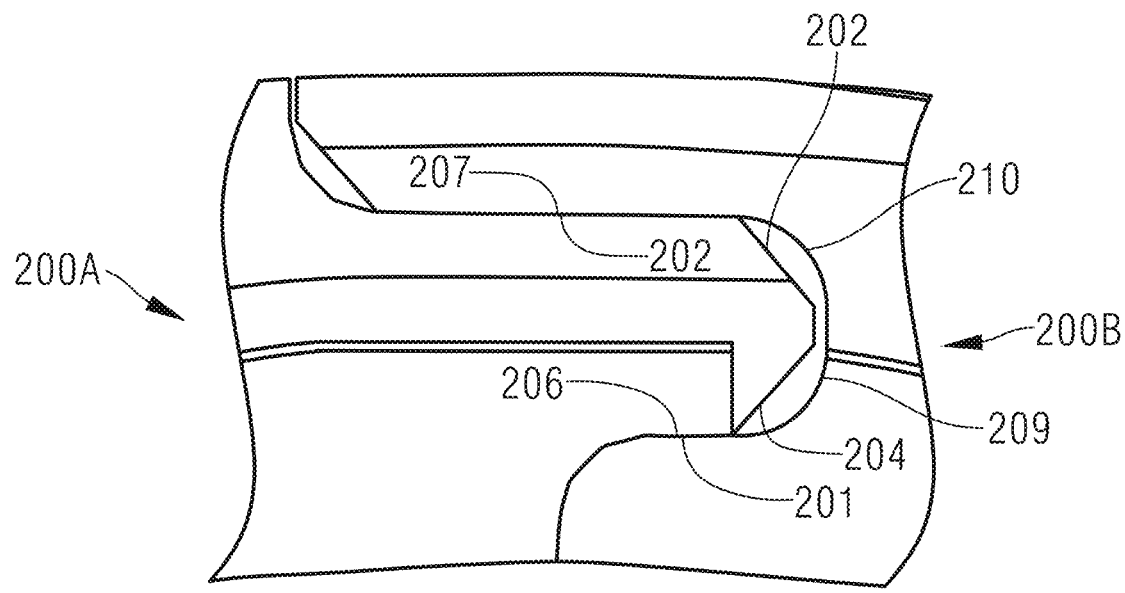
FIG. 3A illustrates the female portion of the second ring segment 200B engaging the male portion of the first ring segment 200A in the manner of tongue and groove viewed from a front axial side.
Figure 3B:
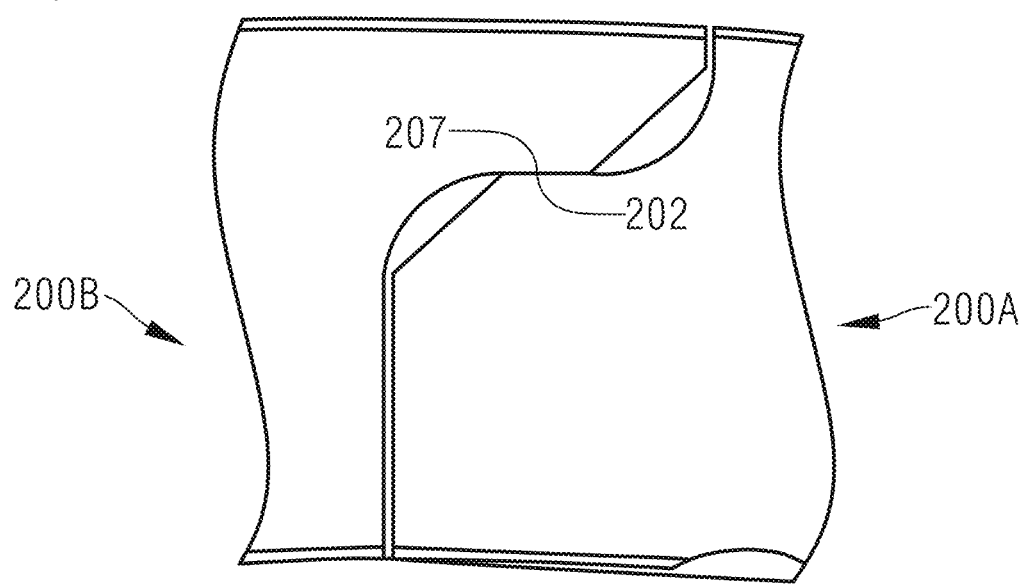
FIG. 3B illustrates the female portion of the second ring segment 200B engaging the male portion of the first ring segment 200A in the manner of tongue and groove viewed from a rear axial side.

FIG. 2A illustrates a perspective view of a first ring segment 200A comprising a male portion. FIG. 2B illustrates a perspective view of a second ring segment 200B comprising a female portion. FIG. 3A illustrates the female portion of the second ring segment 200B engaging the male portion of the first ring segment 200A in the manner of tongue and groove viewed from a front axial side. FIG. 3B illustrates the female portion of the second ring segment 200B engaging the male portion of the first ring segment 200A in the manner of tongue and groove viewed from a rear axial side.

The first and second seal rings 101A, 101B are each comprised of a plurality of seal ring segments 200A and 200B.

The angular extent of each segment is the same e.g. the angular extent of the first seal ring segment 200A is the same as the angular extent of the second seal ring segment 200B.

The male portion of the first ring segment 200A comprises: a first inner sealing surface 201; a first outer sealing surface 202; a first axial surface 203; an inner chamfered surface 204; and, an outer chamfered surface 205.

The female portion of the second ring segment 200B comprises: a second inner sealing surface 206; a second outer sealing surface 207; a second axial surface 208, an inner concave surface 209; and, an outer concave surface 210.

When the male portion of the first sealing ring segment 200A is engaged within the female portion of the second sealing ring segment 200B, the inner interface comprises the first inner sealing surface 201 and the second inner sealing surface 206.

When the male portion of the first sealing ring segment 200A is engaged within the female portion of the second sealing ring segment 200B, the outer interface comprises the first outer sealing surface 202 and the second outer sealing surface 207.

The outer interface is radially outward from the inner interface.

The first inner sealing surface 201, the first outer sealing surface 202, the second inner sealing surface 206 and the second outer sealing surface 207 are flat e.g. the surfaces have no curvature.

The first inner sealing surface 201 is parallel to the first outer sealing surface 202. The second inner surface 206 is parallel to the second outer surface 207.

The first inner sealing surface 201 is configured to be parallel to the second inner sealing surface 206 when the male portion of the first sealing ring segment is engaged within the female portion of the second sealing ring segment.

The first outer sealing surface 202 is configured to be parallel to the second outer sealing surface 207 when the male portion of the second sealing ring segment 200B is engaged within the female portion of the first sealing ring segment 200A.

In the engaged position, the first axial surface 203 is configured to abut the second axial face 208.

In the engaged position, the contact (e.g. abutment) between the first axial surface 203 and the second axial surface 208 is configured to constrain axial movement between the seal ring segments.

In the engaged position an axial edge of the inner interface is closed by the second axial face 208, so that in the event that a fluid flow is provided to the inner interface, the second axial face 208 is configured to direct the fluid flow to the inner interface. In the engaged position an axial edge of the outer interface is closed by the second 208 axial face, wherein in the event that a fluid flow is provided to the inner abutment, the second axial face 208 and the outer sealing surfaces 202, 207 are configured to provide a seal.

The inner concave surface 209 of the second ring segment 200B is configured to accommodate the inner chamfered surface 204 the first ring segment 200A when the male portion of the first ring segment 200A is engaged within the female portion of the second ring segment 200B. For example, the inner concave surface 209 of the second ring segment 200B and the inner chamfered surface 204 of the first ring segment 200A are shaped such that these surfaces 204, 209, do not touch when the male portion of the first sealing ring segment 200A is engaged within the female portion of the second sealing ring segment 200B.

The outer concave surface 210 of the second ring segment 200B is configured to accommodate the outer chamfered surface 205 the first ring segment 200A when the male portion of the first ring segment 200A is engaged within the female portion of the second ring segment 200B. For example, the outer concave surface 210 of the second ring segment 200B and the outer chamfered surface 205 of the first ring segment 200A are shaped such that these surfaces 205, 210, do not touch when the male portion of the first sealing ring segment 200A is engaged within the female portion of the second sealing ring segment 200B.

Conveniently, providing one or more chamfered surface on the male portion of the joint makes a joint easier to manufacture, for example, tolerances between these parts of the joint may be greater than if two curved surfaces were provided.

Providing inner and outer concave surfaces 209, 210, of the second ring segment 200B which are respectively configured to accommodate inner and outer chamfered surfaces 204, 205 of the first ring segment 200A may ensure that the only radial and/or circumferential contact between the male portion of the first ring segment 200A and the female portion of the second ring segment 200B is at either of:
  (i) the inner interface (e.g. between the first inner sealing surface 201 and the second inner sealing surface 206); or,
  (ii) the outer interface (e.g. between the first outer sealing surface 202 and the second outer sealing surface 207).

Conveniently, the manufacturing tolerances between the inner chamfered surface 204 and the inner concave surface can be increased by providing the chamfer. Accordingly, less manufacturing precision and/or manufacturing time may be required to provide chamfered surfaces in comparison to providing curves surfaces. Accordingly, providing any of the outer chamfered surface 209 and the inner chamfered surface 210 may reduce the time required to manufacture the first sealing ring segment 200A.

Figure 4A:
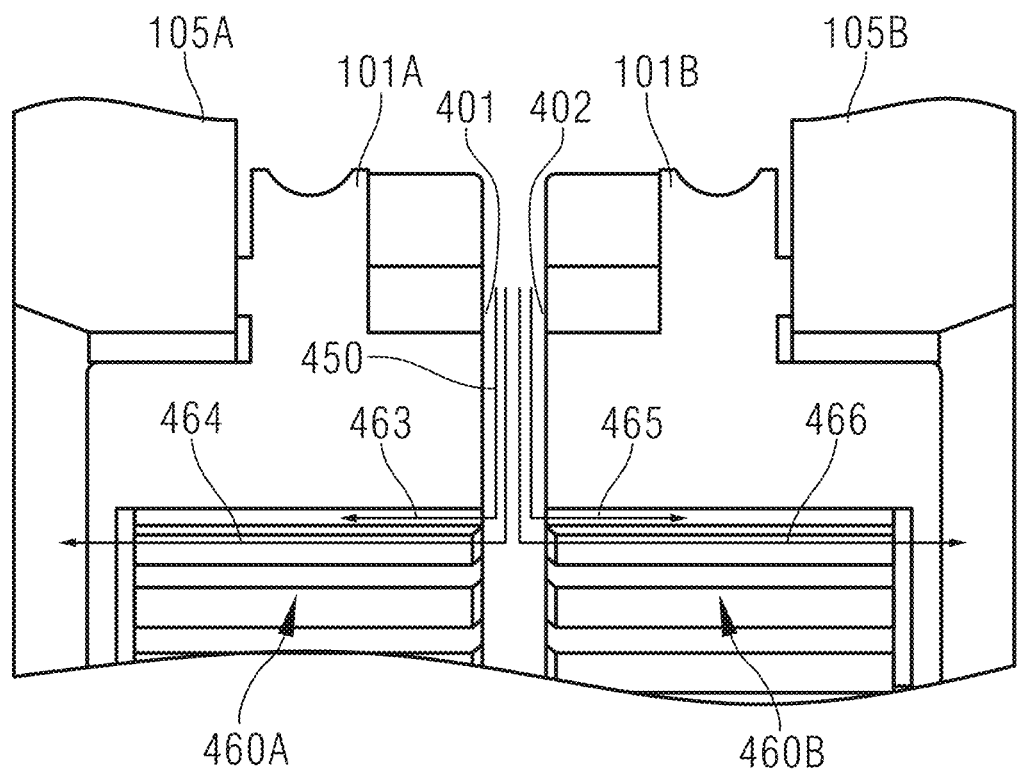
FIG. 4A illustrates a radial cross-sectional view of a first and second seal rings 101A, 101B disposed between first and second clamp plates 403, 404.
Figure 4B:
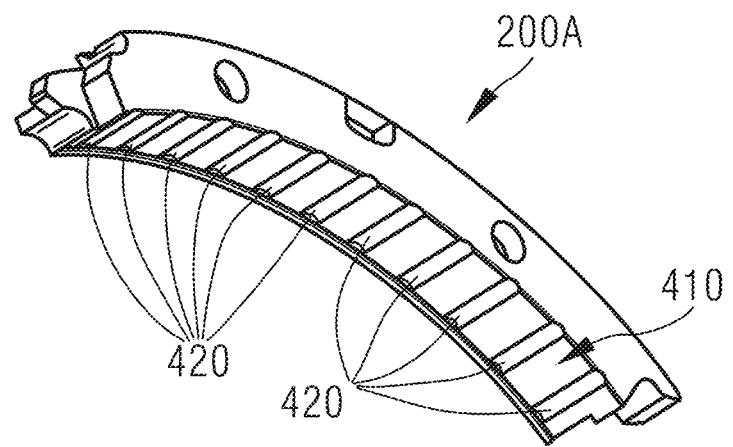
FIG. 4B illustrates a perspective view of a seal ring segment.

FIG. 4A illustrates a radial cross-sectional view of the first and second seal rings 101A, 101B disposed between first and second clamp plates 105A, 105B. FIG. 4B illustrates a perspective view of a seal ring segment 400A.

Each of the seal rings 101A, 101B are formed of a plurality of the seal ring segments 200A and 200B. The seal rings 101A, 101B are disposed in the seal assembly so that the rear side 101AR of a first seal ring 101A opposes the rear side 101BR of the second seal ring 101B. A radial passage is provided between the rear side 401 of the first seal ring 101A and the rear side 402 of the second seal ring 101B.

The nook of the first seal ring 101A receives the corner portion 403 of the first clamp plate 105A when the first seal ring 101A is in the maximum expanded position. The nook of the first seal ring 101A receives the corner portion 403 of the first clamp plate 105A when the first seal ring 101A is in the maximum expanded position.

The seal ring segment 400A comprises a radially inner surface 410. The radially inner surface comprises axial grooves which extend across most of the axial extent of the seal ring segment (e.g. the axial grooves 420 extend across 50% or more of the axial extent of the seal ring segment).

The seal ring may be configured to expand (e.g. increase in radial extent). For example, a fluid flow may be provided to an inner tangential surface of each of the seal ring segments. The inner tangential surface 410 of the seal ring segments comprises a plurality of axial grooves 420. The axial grooves 420 extend along most of the axial extent of the seal ring segments. Similarly grooves are provided on other seal segments in the seal ring e.g. on seal ring segment 400B.

The axial grooves 420 are configured to receive a fluid flow (e.g. a fluid flow is capable of flowing along the axial grooves). At least one of the axial grooves 420 on the inner tangential surface of a seal ring segment 400A may be in fluid communication with the inner interface formed by the seal ring segment 400A and a neighbouring seal ring segment 400B.

The seal assembly is configured to provide a fluid flow to the inner tangential surface of the seal ring segments. The fluid flow exerts a radially outward pressure on the radially inner surface of the seal ring (e.g. in each of the axial grooves). The radially outward pressure exerts a radially outward force on the seal ring segment. The seal ring segment is configured to move radially outwards if the radially outward force is greater than the combination of the weight of the seal ring segment and the radially inward tension provided by the garter springs. When the radially outward force exceeds a predetermined lift-off force, the seal ring segment is moved in a radially outward direction (e.g. away from a rotational axis of a seal assembly). The predetermined lift-off force may be based on any of: the weight of the seal ring segment; and, radially inward tension provided by garter springs.

The seal ring is configured to contract (e.g. increase in radial extent). In the example shown, the garter springs are provided which exert a radially inward tension on the seal ring segments. Reduction of the radially outward force on the inner tangential surface of the seal ring segments (e.g. due to a reduction in the radially outward pressure) to below the predetermined lift-off force may cause contraction of the seal ring.

At least one of the axial grooves 410 on a seal ring segment is in fluid communication with the inner interface of the seal ring segment and one of the neighbouring seal ring segments.

When the first ring segment is in an engaged position with the second ring segment, in the event that a fluid flow (e.g. axially outward), is provided to the inner interface, fluid pressure from the fluid flow pushes the inner interface apart (e.g. pushes the first inner sealing surface 201 away from the second inner sealing surface 206) to seal the outer interface (e.g. to push the first outer sealing surface 202 into abutment with the second outer sealing surface 207).

The fluid flow comprises a flow of fluid (e.g. such as a process fluid or a buffer fluid). The fluid flow comprises an upstream part 450 and a downstream part 460, wherein:
  the upstream part 450 moves in a radially inwards direction (from a radially outer position to a radially inner position); and,
  the downstream part 460 moves in an axially outward direction (towards an axially outer position).

The upstream part 450 moves through the radial passage provided between the rear side 401 of the first seal ring 101A and the rear side 402 of the second seal ring 101B The upstream part 450 bifurcates into a first downstream part 460A which moves in a first axial direction and a second downstream part 460B which moves in a second axial direction.

The first downstream part 460A flows past an inner tangential surface of the first seal ring. In the example shown, the downstream part 460 flows through the axial grooves 420.

The second downstream part 460B flows past an inner tangential surface of the second seal ring. In the example shown, the downstream parts 460A, 460B flow through the axial grooves 420.

The first downstream part 460A bifurcates into a third downstream part 463 and a fourth downstream part 464. The third downstream part 463 flows towards an inner interface between seal segments of the first seal ring 101A. The fourth downstream part 464 flows towards an inner interface between seal segments of the first seal ring 101A.

The third downstream part 463 is directed towards the inner interface. At the inner interface, the third downstream part 463 exerts a pressure on the first axial surface 203 (e.g. the third downstream part 463 pushes on the first axial surface 203) which causes the axial movement of the first seal ring 101A so that the rear side 401 of the first seal ring 101A moves towards (e.g. into contact with) the clamp plate 105A.

The first seal ring 101A comprises a plurality of such axial surfaces 203 which are all under the same pressure from respective third downstream part of the flow. In examples, the joints of the seal ring and therefore, the plurality of axial surfaces 203, are disposed equidistantly around the first seal ring 101A i.e. the ring segments which form the seal ring have the same angular extent about the centre of the seal ring. As each of the equidistantly spaced first axial surfaces 203 is acted on by an identical third downstream parts 463 (e.g. identical in that they have equal pressures). For example, the net force acting on all of the first axial surfaces 203 may be zero.

When the pressure of the third downstream part 463 at the inner interface is above an activation pressure, the fluid pressure of the third downstream part 463 of the flow activates the joint. In other words, the fluid pressure of the third downstream part 463 pushes the sealing surfaces of the inner interface apart to seal the outer interface (e.g. to push the sealing surfaces of the outer interface into abutment).

The fourth downstream flow 464 is directed by the geometry of seal ring 101A at the joint towards the inner interface comprising sealing surfaces 201 and 206. When the pressure of the fourth downstream part 464 at the inner interface is above an activation pressure, the fluid pressure of the fourth downstream part 464 of the flow activates the joint. In other words, the fluid pressure of the fourth downstream part 464 pushes the sealing surfaces of the inner interface apart to seal the outer interface (e.g. to push the sealing surfaces of the outer interface into abutment).

In examples, the joint may be activated when the combined fluid pressure of the third downstream part 463 and the fourth downstream part 464 at the inner interface is above the activation pressure.

The fourth downstream part 464 also exerts a pressure between the first seal ring 101A and the sleeve 103 (about which sleeve 103 the first seal ring 101A is disposed) which causes a gap to form between the sleeve 103 and the first seal ring 101A e.g. the downstream part 464 is configured to cause the first seal ring 101A to lift-off from the rotatable sleeve 103 to thereby enable a non-contacting operation between the sleeve 103 (a rotation body) and the first seal ring 101A (a stationary body).

Furthermore, the fourth downstream part 464 subsequently exits the space formed between the sleeve 103 and the first seal ring 101A. As the fourth downstream part 464 exits the space, the fourth downstream part 464 expands. The outflow of fourth downstream part 464 from between the sleeve 103 and the first seal ring 101A prevents material (e.g. oil) from entering the space between the first seal ring 101A and the sleeve 103.

The second downstream part 460B bifurcates into a fifth downstream part 465 and a sixth downstream part 466. The fifth downstream part 465 flows towards an inner interface between seal segments of the second seal ring 101B. The sixth downstream part 466 flows towards an inner interface between seal segments of the second seal ring 101B.

The fifth downstream part 465 acts in the same manner as the third downstream part 463 but rather fifth downstream part 465 acts on the second seal ring 101B whereas the third downstream part 463 acts on the first seal ring 101A.

The sixth downstream part 466 acts in the same manner as the fourth downstream part 464 but rather sixth downstream part 466 acts on the second seal ring 101B whereas the fourth downstream part 464 acts on the first seal ring 101A.

When the joint is activated, the first outer sealing surface 202 and the second outer sealing surface 207 are pushed into abutment. As described above, the first outer sealing surface 202 and the second outer sealing surface 207 are flat and parallel to one another in the engaged position. The abutment between first outer sealing surface 202 and the second outer sealing surface 207 comprises planar contact between the two surfaces e.g. a flat 2-dimensional shape describes the contact between the first outer sealing surface 202 and the second outer sealing surface 207.

The pressure of the first downstream portion 461 which activates the joint provides a force on the second inner sealing surface 206 of the male portion of the second sealing ring segment 200B and the planar contact between the first outer sealing surface 202 and the second outer sealing surface 207 provides a force on the second outer sealing surface. The sealing ring is configured such that the pair of forces (one on the inner second sealing surface 206, another on the outer second surface 207) are balanced to constrain the radial movement of the male portions of the sealing ring segments relative to the female portions of the sealing ring segments. Accordingly, jack-knifing between male portions and female portions is prevented.

Figure 5A:
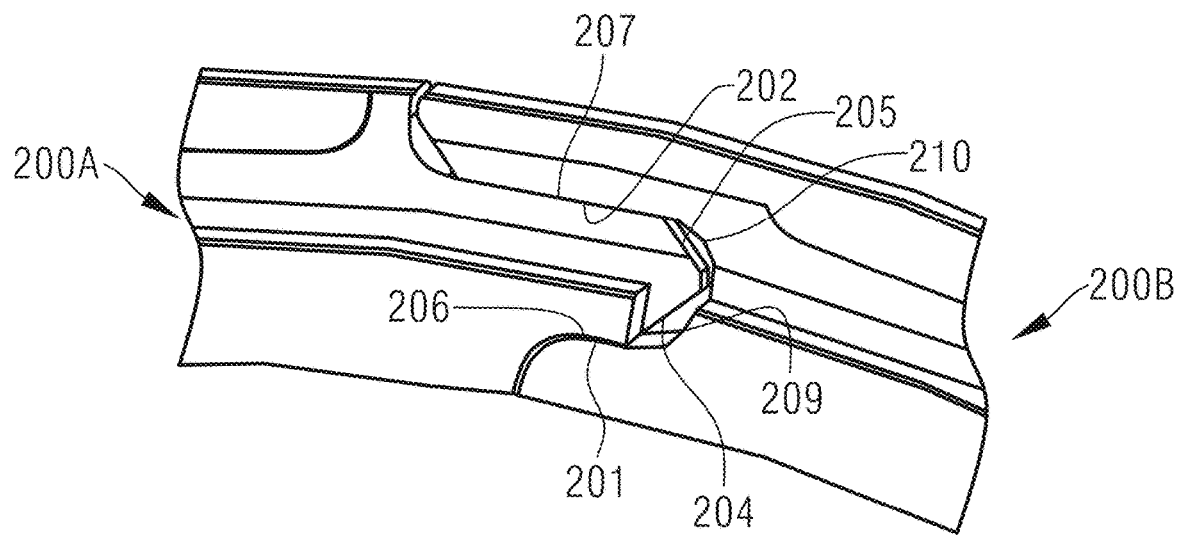
FIG. 5A illustrates a perspective view of a joint between the female and the male portion of the first and second sealing ring segments 200A and 200B in a contracted position.
Figure 5B:
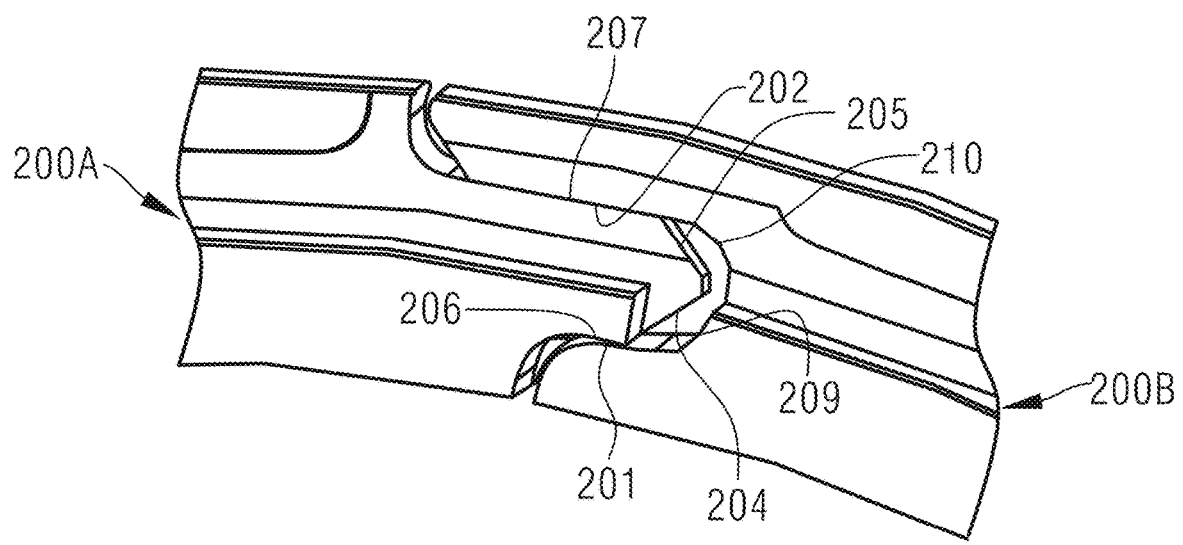
FIG. 5B illustrates a perspective view of a joint between the female and the male portion of the first and second sealing ring segments 200A and 200B in an expanded position.

FIG. 5A illustrates a perspective view of a joint between the female and the male portion of the first and second sealing ring segments 200A and 200B in a contracted position. FIG. 5B illustrates a perspective view of a joint between the female and the male portion of the first and second sealing ring segments 200A and 200B in an expanded position.

The seal ring comprises a plurality of ring segments (e.g. N segments) and there are a corresponding number of joints (e.g. N joints) between these segments, each joint comprising a female portion and male as shown in FIGS. 5A and 5B.

The contracted position, shown in FIG. 5A, is the minimum separation between the first and second seal ring segments. The minimum effective radius of the seal ring is the effective radius of the seal ring in the contracted position. The effective radius of the seal ring in the contracted position, Reffmin may be defined as the radius of a circle, wherein in the contracted position, the radially outermost edges of the ring lie on that circle.

The seal ring segments separate from one another from the contracted position to an expanded position.

In the expanded position, shown in FIG. 5B, there is a tangential displacement, ΔD between the first sealing ring segment 200A and the second sealing ring segment 200B. The tangential displacement comprises a displacement in a direction tangential to a radius of the seal ring. Accordingly, a given expanded position may be characterised by the tangential displacement ΔD between the first sealing ring segment 200A and the second sealing ring segment 200B. The effective radius Reff of the seal ring in an expanded position may be defined as the radius of a circle, wherein in the expanded position, the radially outermost edges of the ring lie on that circle.

There is a maximum expanded position which may be defined as the expanded position in which the tangential displacement between each of the seal ring segment is a maximum tangential displacement permitted between the first seal ring segment 200A and the second seal ring segment 200B. The maximum tangential displacement is determined by the total amount of radial expansion of the seal ring from the contracted position to expanding to a size wherein the outer surface of the seal ring comes into contact with the clamp plate. The effective radius Reffmax of the seal ring in the maximum expanded position may be the radius of the inner tangential surface of a clamp plate which abuts the outer tangential surface of the seal ring to thereby provide a seal between the seal ring and the clamp plate.

The seal ring can expand continuously from the contracted position to the maximum expanded position. When the seal ring expands, the first outer sealing surface 202 and the second outer sealing surface 207 remain in planar contact. Conveniently, the planar contact prevents jack-knifing between the two seal ring segments.

Two planar surfaces of an interface conveniently may cooperate to prevent jack-knifing between the first seal ring segment and the second seal ring segment.

For example, the second inner sealing surface and second outer sealing surface of the female portion may be parallel to one another and spaced from each other such that the male portion may be received in the female portion (e.g. so that the first inner sealing surface abuts the second inner sealing surface and the first outer sealing surface abuts the second outer sealing surface). In such examples, there is no space between either of first inner sealing surface and the second inner sealing surface or the first outer sealing surface and the second outer sealing surface and therefore jack-knifing (e.g. positioning the sealing surface at the inner interface or the outer interface is not possible) is not possible.

For example, when the joint is activated (e.g. a fluid flow is provided to the sealing surfaces at the inner interface) the flat sealing surfaces at the outer interface are pushed into planar contact to thereby provide a seal. Provided the fluid flow continues to activate the joint the sealing surfaces at the outer interface remain in planar contact thereby resisting jack-knifing.

Furthermore, at each joint in a complete seal ring, each pair of outer sealing surfaces at each outer interface are pushed into planar contact simultaneously. Accordingly, jack-knifing at a particular joint is resisted because the remaining joints have outer sealing surfaces which are being maintained in planar contact.

The seal ring can contract continuously from the maximum expanded position to the contracted position. When the seal ring contracts, the first outer sealing surface 202 and the second outer sealing surface 207 remain in planar contact. Conveniently, the planar contact prevents jack-knifing between the two seal ring segments.

In examples, garter springs are arranged to bias the seal ring segments towards the longitudinal axis of the seal assembly. The garter springs are configured to permit expansion of the seal ring when the seal ring is driven above a predetermined angular speed (e.g. the angular speed above which expansion of the seal ring is permitted). The garter springs are configured to resist expansion of the seal ring when the seal ring is driven at or below the predetermined angular speed.

When the seal ring expands or contracts, the displacement between tangential displacement from the contracted position at each joint is equal. Conveniently, the centre of mass of the seal ring remains at the rotational axis of the assembly (e.g. the seal ring maintains an overall circular shape when it expands or contracts).

Herein the female portion may be referred to as a "complementary portion". Herein the male portion may be referred to as a "complementary portion". In other words, the female portion and the male portion are shaped in a complementary manner such that the female portion is configured to receive the male portion.

In use, the seal assembly shown in FIG. 1 receives a fluid flow which causes the seal ring radially expand and to lift-off the sleeve 103. In more detail, the rings receive a radially inward fluid flow 450 between the rear sides of each of the seal rings (as shown in FIG. 4). The radially inward flow 450 changes direction to become an axially outward flow 460. The axially outward flow 460 passes, through axial grooves 420 in the seal rings, between an inner tangential surface of each seal ring and the sleeve 103.

The fluid flow exerts a radially outward force on the seal rings due to the pressure of the fluid flow. If the radially outward force exceeds a predetermined threshold pressure, the seal ring segments of each seal ring move axially outwards, thereby forcing the seal ring away from the sleeve 103 and towards the clamp plate 105. The outward radial movement of seal segments simultaneously forces the seal ring segments away from each other (e.g. the separation between neighbouring seal ring segments increases).

At least one of the axial grooves is in fluid communication with each of the inner interfaces. At least a portion of the axially outward fluid flow passes from the inner tangential surface of the seal ring segments and to each inner interface. At each inner interface the fluid flow pushes the sealing surfaces of the inner interface (the first inner sealing surface 201 and the second inner sealing surface 206) apart (e.g. increases the radial separation between these surfaces). Correspondingly, the sealing surfaces at the outer interface are pushed together to thereby provide a seal.

The sealing surfaces at the outer interface (the first outer sealing surface 202 and the second outer sealing surface 207) are flat. The sealing surfaces at the outer interface at pushed into planar contact. When the sealing surfaces are urged to into planar contact, for example, when there is force applied to an inner interface, the planar contact between these surfaces resists jack-knifing between the male portion and the female portion of the joint. The planar contact between the sealing surfaces at the outer interfaces permits tangential movement between the sealing surfaces thereby permitting separation of neighbouring seal ring segments. Separation of neighbouring seal ring segments results in expansion of the seal ring. When the seal ring expands so that an outer tangential surface of the seal ring abuts the clamp plate, a seal is provided between the seal ring and the clamp plate.

Figure 6A:
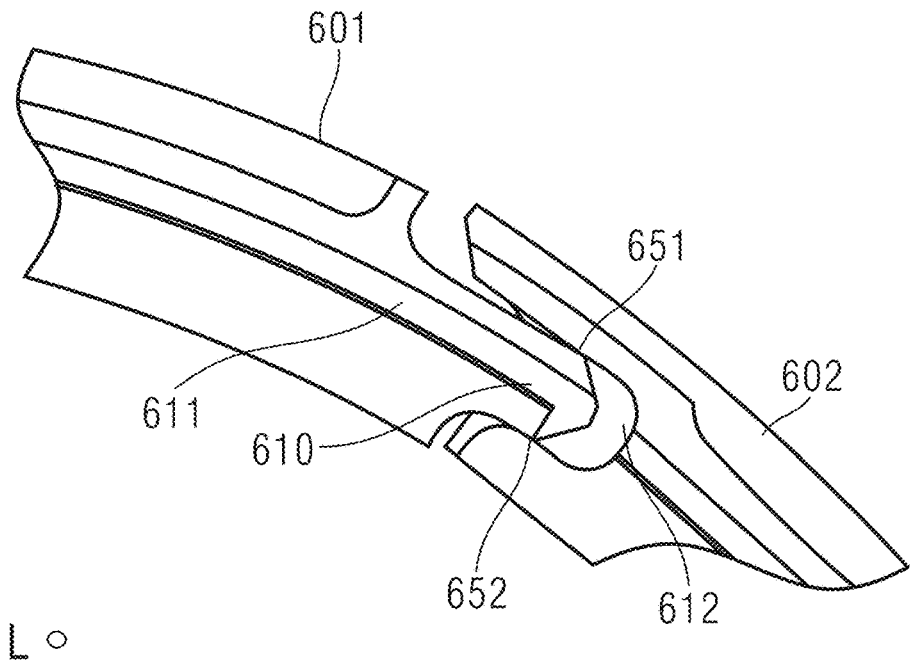
FIG. 6A illustrates jack-knifing between two seal ring segments in a radially outward direction (outward jack-knifing)
Figure 6B:
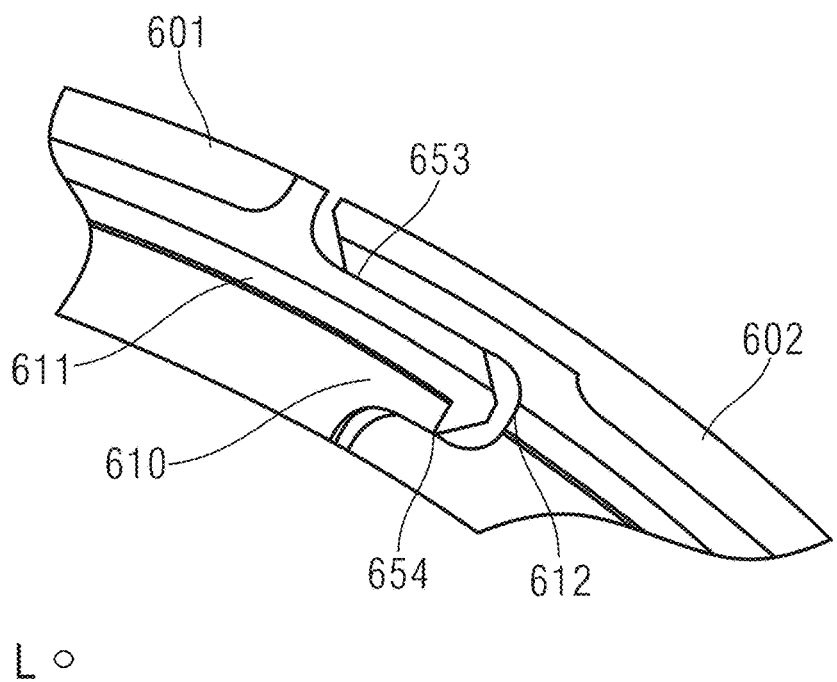
FIG. 6B illustrates jack-knifing between two seal ring segments in a radially inward direction (inward jack-knifing).

FIG. 6A illustrates jack-knifing between two seal ring segments in a radially outward direction (outward jack-knifing). FIG. 6B illustrates jack-knifing between two seal ring segments in a radially inward direction (inward jack-knifing).

In both FIG. 6A and FIG. 6B, there is a first seal ring segment 601 and a second seal ring segment 602. The first seal ring segment 601 comprises a male portion 611 and the second seal ring segment 602 comprises a female portion 612. The male portion 611 is received by the female portion 612 in the manner of tongue and groove to provide a joint. When male portion 611 is received by the female portion 612 in the manner of tongue and groove to provide a joint the seal ring segments 601, 602 collectively define an arcuate portion of a circle.

FIG. 6A illustrates outward jack-knifing at the joint 610. When there is outward jack-knifing of the joint, the seal ring segments 601, 602 each rotate about the joint such that the rotation is towards the locus L (e.g. centre) of the arcuate portion of the circle they collectively define. When there is outward jack-knifing, line contacts 651, 652 are formed between the first seal ring segment 601 and the second seal ring segment 602.

FIG. 6B illustrates inward jack-knifing at the joint 610. When there is inward jack-knifing of the joint, the seal ring segments 601, 602 each rotate about the joint such that the rotation is away from locus L (e.g. centre) of the arcuate portion of the circle they collectively define. When there is inward jack-knifing, line contacts 653, 654 are formed between the first seal ring segment 601 and the second seal ring segment 602.

Any feature of any one of the examples disclosed herein may be combined with any selected features of any of the other examples described herein. For example, features of methods may be implemented in suitably configured hardware, and the configuration of the specific hardware described herein may be employed in methods implemented using other hardware. The description or claiming of a method in which steps are mentioned in a particular order is not intended to imply that any one step necessarily precedes another. Unless otherwise stated, the steps of such methods may be applied in any appropriate sequence.

It will be appreciated from the discussion above that the embodiments shown in the Figures are merely exemplary, and include features which may be generalised, removed or replaced as described herein and as set out in the claims. With reference to the drawings in general, it will be appreciated that they are merely exemplary and should not be taken to imply that any particular structure is essential to the invention other than as expressly set forth herein.

The term tangential surface is used herein to define a surface which faces radially outwards from a ring (e.g. the outward edge which faces away from its axis). It will be appreciated in the context of the present disclosure that such tangential surfaces may be aligned tangentially (i.e. they may be in the form of a curved outer surface of a cylinder).

The term axial surface is used herein to define a surface which is perpendicular to the axis of a ring (e.g. in the manner of the flat end of a cylinder).

Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A seal ring for a radial separation seal, the seal ring comprising:
 a first ring segment comprising a male portion; and
 a second ring segment comprising a female portion, wherein the female portion is configured to engage the male portion in the manner of a tongue and groove joint, the joint having:
  an inner interface at which the first ring segment abuts the second ring segment, the inner interface comprising two inner sealing surfaces; and
  an outer interface at which the first ring segment abuts the second ring segment the outer interface comprising two outer sealing surfaces;
 wherein the outer interface is radially outward from the inner interface, wherein the first and second ring segments are moveable relative to one another so that they can be in either a contracted or expanded position, wherein in the contracted position the inner sealing surfaces are in contact and the outer sealing surfaces are not and wherein when a fluid flow is provided to the inner interface, fluid pressure from the fluid flow moves the first and second ring segments into the expanded position by pushing the inner sealing surfaces of the inner interface apart to seal the outer sealing surfaces of the outer interface together.

2. The seal ring of claim 1, wherein, in the engaged position, the female portion and the male portion are configured to permit relative movement between the first ring segment and the second ring segment.

3. The seal ring of claim 1, wherein the two sealing surfaces comprise flat portions.

4. The seal ring of claim 3, wherein the seal at the outer interface comprises planar contact between the two outer sealing surfaces.

5. The seal ring of claim 1, wherein the outer sealing surfaces are configured to resist jack-knifing when the outer sealing surfaces are in abutment.

6. The seal ring of claim 1, wherein the second ring segment comprises:
 an axial face, wherein in the engaged position an axial edge of the inner interface is closed by the axial face, so that in the event that a fluid flow is provided to the inner interface, the axial face is configured to direct the fluid flow to the inner interface.

7. The seal ring of claim 1,
 wherein the two interfaces are each provided by a pair of flat planar sealing surfaces to provide planar contact between the two ring segments thereby to resist jack-knifing between the first ring segment and the second ring segment.

8. The seal ring of claim 7, wherein the second ring segment comprises:
 an axial face, wherein in the engaged position an axial edge of the inner interface is closed by the axial face, so that in the event that a fluid flow is provided to the inner interface, the axial face is configured to direct the fluid flow to the inner interface.

9. The seal ring of claim 7, wherein in the engaged position an axial edge of the outer interface is closed by the axial face, wherein in the event that a fluid flow is provided to the inner interface, the axial face and the outer sealing surfaces are configured to provide a seal.

* * * * *